C. W. PARSONS.
TRACTOR FRAME.
APPLICATION FILED SEPT. 22, 1917.
1,289,532.
Patented Dec. 31, 1918.
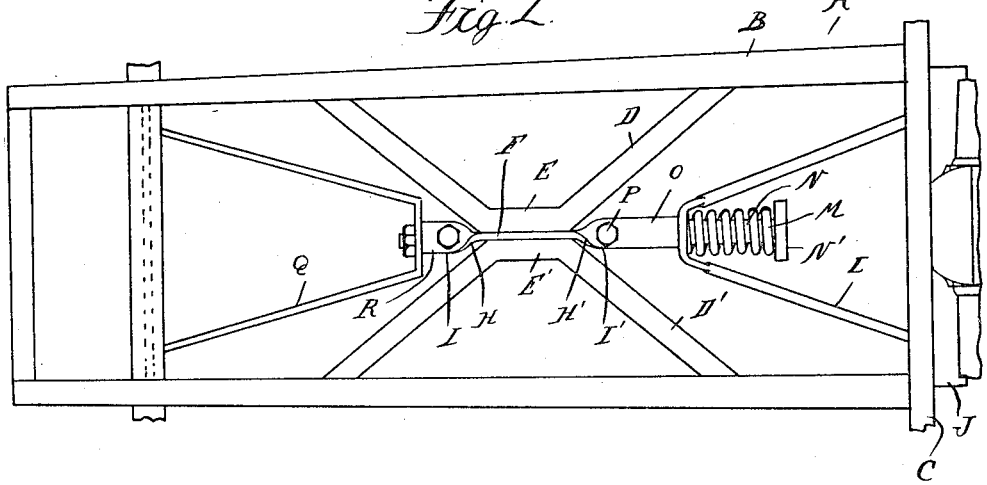
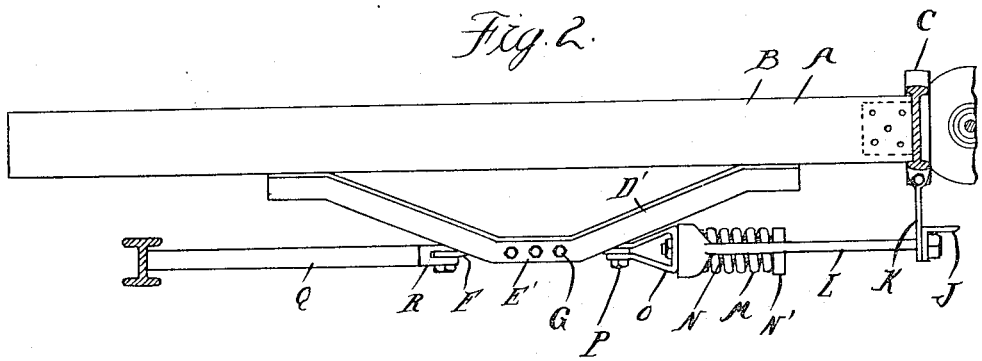
Inventor
Channing W. Parsons
By Whittemore Hulbert & Whittemore
Attorneys

UNITED STATES PATENT OFFICE.

CHANNING W. PARSONS, OF ALMA, MICHIGAN, ASSIGNOR TO R & P TRACTOR COMPANY, OF ALMA, MICHIGAN, A CORPORATION OF ILLINOIS.

TRACTOR-FRAME.

1,289,532.  Specification of Letters Patent.  Patented Dec. 31, 1918.

Application filed September 22, 1917. Serial No. 192,705.

*To all whom it may concern:*

Be it known that I, CHANNING W. PARSONS, a citizen of the United States of America, residing at Alma, in the county of Gratiot and State of Michigan, have invented certain new and useful Improvements in Tractor-Frames, of which the following is a specification, reference being had therein to the accompanying drawings.

The invention relates to tractors and has particular reference to the construction of the frame and draft mechanism for implements to be attached. The invention comprises the novel features as hereinafter set forth.

In the drawings:

Figure 1 is a plan view of the frame;

Fig. 2 is a sectional side elevation thereof.

A is a substantially rectangular frame, comprising the longitudinal sills B and cross sills C. D and D' are brace-bars which at their ends are attached to the side-sills B of the frame and which are inclined downward and inward toward their central portions. These brace-bars are preferably formed of angle-bars, and their central portions E and E' are arranged adjacent and parallel to each other. F is a draft-bar between the central portions E and E', secured thereto by suitable means, such as the bolts G. The ends of this draft-bar are twisted, as indicated at H and H', to form ear portions I and I' which lie in a horizontal plane. J is a transversely-arranged draft-bar yieldably supported by swinging links K from the frame A. L is a strap member having obliquely-arranged sides connected at their outer ends with the bar J. M is a spring seated on the central portion of the member L, N is a bar passing through the spring M and having a head N' engaging the opposite end thereof, and O is a bifurcated connection between the bar N and the ear I', being pivotally attached to the latter by a bolt P. At the opposite end of the bar F there is attached a similar strap Q by means of the pivoted bifurcated member R which also has a swivel connection with said strap. The member Q forms a reach-bar for connecting with the forward axle and permits of freedom of movement of said axle in a vertical plane while retaining it rigidly tied longitudinally of the frame.

With the construction described, the frame A may be mounted upon suitable running gear (not shown) and driven by a suitable motor. The implements to be drawn are attached to the transverse bar J and the latter is yieldably drawn by the strap L, spring N and other coöperating parts. The draft stress is transmitted to the frame through the medium of the obliquely-inclined brace-bars D. These bars also serve as a rigid anchor for the reach connection Q to the forward axle.

What I claim as my invention is:

1. A tractor frame, comprising a main frame, brace-members extending obliquely inward and downward from the sides of said main frame, a draft-bar intermediate the central portions of said brace-members and connected thereto, and a reach-member connected to the opposite end of said bar and extending to the forward axle.

2. A tractor frame, comprising a main frame having longitudinal side sills and cross-bars, a sub-frame consisting of bent bars having parallel portions at the center of said main frame and end portions extending obliquely outward and upward and secured to said side sills, a bar clamped intermediate said brace members, a transversely-extending draft bar, swinging links for supporting said draft bar on said main frame, and a yieldable connection between said draft bar and the bar clamped between said brace-members.

3. A tractor frame, comprising a main frame of substantially rectangular form and having longitudinally-extending side sills, a sub-frame formed of bars having central parallelly-arranged portions and obliquely-arranged end portions extending outward and upward and attached to said side sills, a bar secured intermediate said brace-bars and having eyes or pivot bearings at opposite ends thereof, a draft-bar connected to one of said eyes, and a reach-bar connected to the other of said eyes and extending to the forward axle.

4. A tractor frame comprising a main frame of substantially rectangular form having longitudinally-extending side-sills, a sub-frame comprising bent bars having central portions extending longitudinally adjacent to each other and end portions arranged obliquely to extend outward and upward and attached to said side sills, a bar intermediate said brace-bars secured thereto and terminating at its opposite ends in eyes or pivot bearings, a transversely-extending draft-bar, swinging links for separating said draft-bar from the main frame, a strap connected to said draft-bar and extending forward, a shank pivotally secured to the eye of said intermediate bar and telescopically engaging said strap, and a spring sleeved upon said shank and arranged between the same and said strap to form a resilient yieldable connection.

5. A tractor frame, comprising a substantially rectangular main frame having longitudinally-extending side-sills, bars connected at their opposite ends to said side-sills and bent to have central portions parallel to each other and obliquely-arranged intermediate portions, a bar clamped between said central portions and terminating at its opposite ends in eyes for pivot bearings, a transversely-extending draft-bar, swinging links for spreading said draft-bar, a yieldable connection between said bar and one of said eyes, and a non-yielding reach connection between the other of said eyes and the forward axle.

6. A tractor frame, comprising a main frame having longitudinal side sills and cross-bars, a sub-frame consisting of bent bars having parallel portions near the center of said main frame, and end portions extending obliquely outward and secured to said side sills, and a draft bar secured to the parallel portions of said brace members.

In testimony whereof I affix my signature.

CHANNING W. PARSONS.

Copies of this patent may be obtained for five cents each, by addressing the "Commissioner of Patents, Washington, D. C."